(12) United States Patent
Subramanian et al.

(10) Patent No.: US 7,907,761 B2
(45) Date of Patent: Mar. 15, 2011

(54) METHOD FOR REGISTRATION AND NAVIGATION OF VOLUMETRIC SCANS USING ENERGY PROFILES

(75) Inventors: Navneeth Subramanian, Ap (IN); Srikanth Suryanarayanan, Karnataka (IN); Rakesh Mullick, Karnataka (IN)

(73) Assignee: General Electric Company, Schenectady, NY (US)

( * ) Notice: Subject to any disclaimer, the term of this patent is extended or adjusted under 35 U.S.C. 154(b) by 998 days.

(21) Appl. No.: 11/738,066

(22) Filed: Apr. 20, 2007

(65) Prior Publication Data

US 2008/0260286 A1    Oct. 23, 2008

(51) Int. Cl.
*G06K 9/00* (2006.01)
(52) U.S. Cl. ......... 382/128; 382/131; 382/132; 382/154; 382/173; 382/294
(58) Field of Classification Search .................. 382/128, 382/154, 173, 294
See application file for complete search history.

(56) References Cited

U.S. PATENT DOCUMENTS

| 6,744,911 | B1 | 6/2004 | Avila et al. | |
| 6,947,584 | B1 | 9/2005 | Avila et al. | |
| 7,596,267 | B2 * | 9/2009 | Accomazzi et al. | 382/173 |
| 7,813,592 | B2 * | 10/2010 | Vetter et al. | 382/294 |
| 2004/0101179 | A1 * | 5/2004 | Suryanarayanan et al. | 382/128 |
| 2006/0002631 | A1 | 1/2006 | Fu et al. | |

OTHER PUBLICATIONS

Automatic Partitioning of Head CTA for enabling segmentation, Srikanth Suryanarayanan et al (Imaging Technologies, Bangalore). In Proceedings of SPIE—Medical Imaging 2004.
"Intelligent Data splitting for volume data", Hong Shen, Ernst Bartsch (Siemens Corporate Research). In proceedings of SPIE—Medical Imaging 2006.

* cited by examiner

*Primary Examiner* — Tom Y Lu
(74) *Attorney, Agent, or Firm* — Global Patent Operation

(57) ABSTRACT

A method is provided for identifying a location of a region of interest in a volumetric image scan that includes a plurality of slices of an object and wherein each slice, in turn, includes a plurality of pixels. The method includes setting a predetermined pixel intensity threshold corresponding to a particular region of interest; identifying target pixels for each slice from the plurality of pixels that exceed the predetermined pixel intensity threshold; creating an energy profile from the target pixels for each slice; and comparing the energy profile to a predefined energy profile to determine the location of the region of interest.

6 Claims, 7 Drawing Sheets

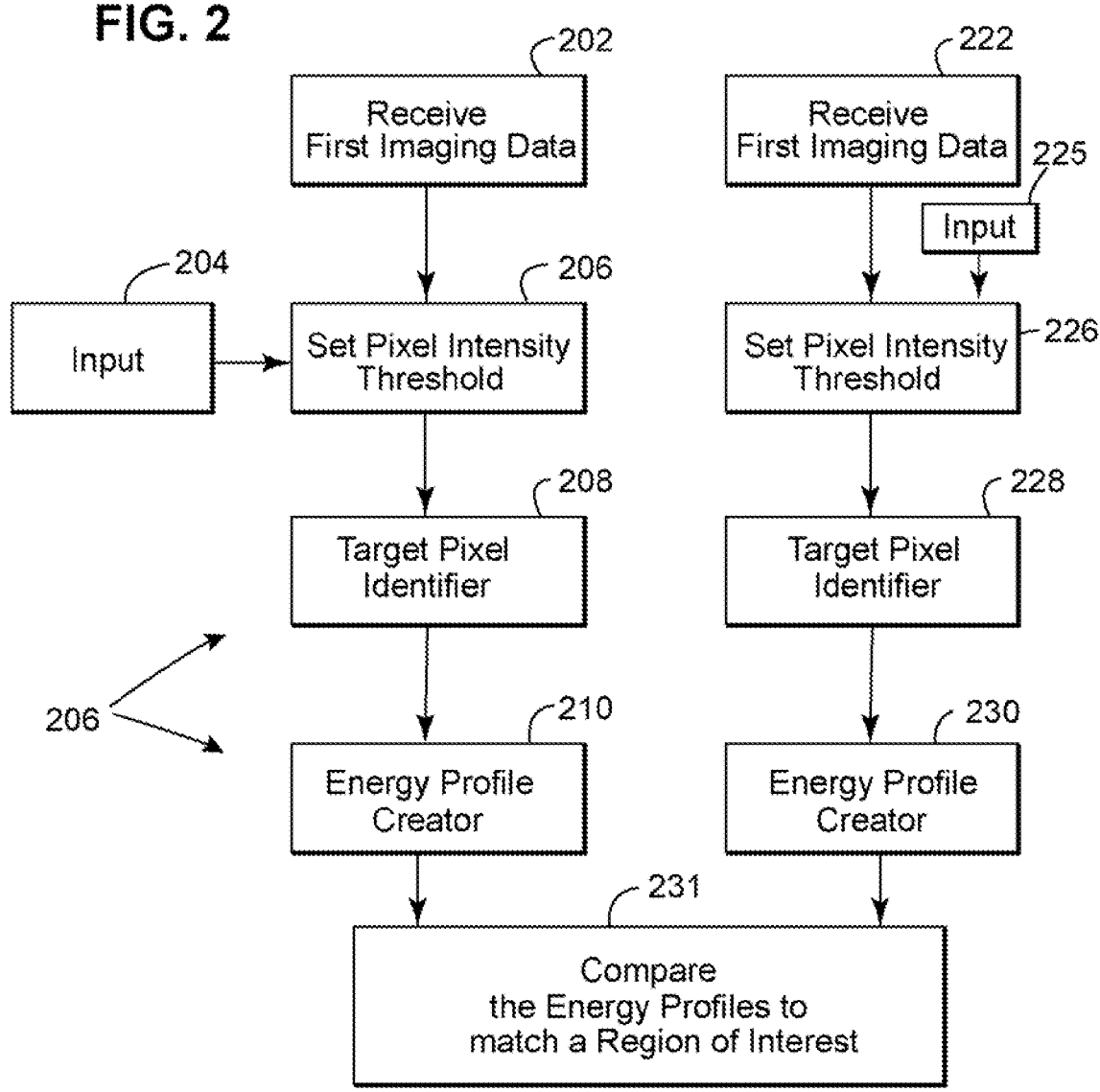

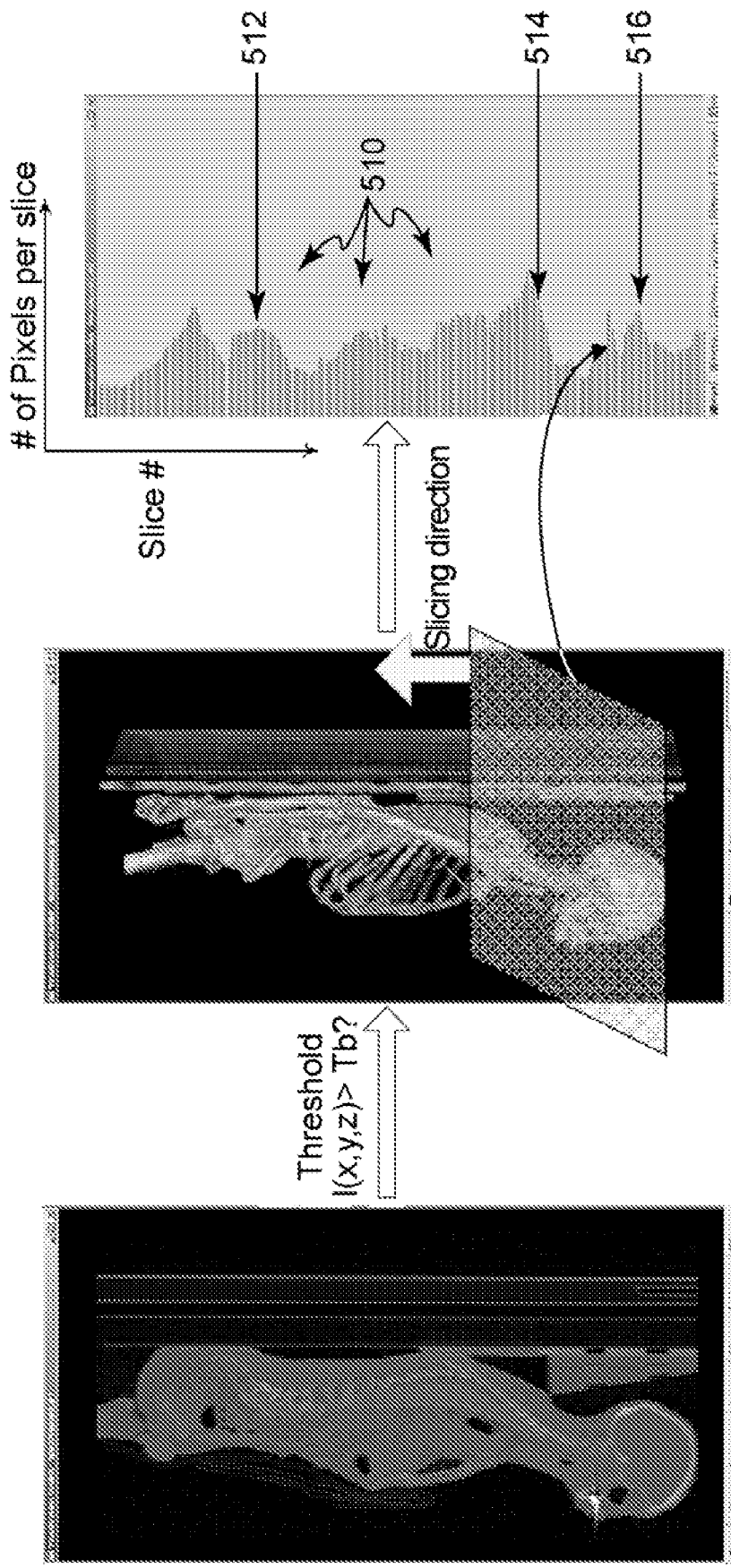

FIG. 6
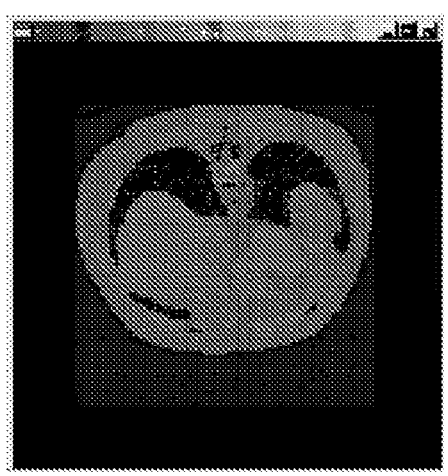
FIG. 7
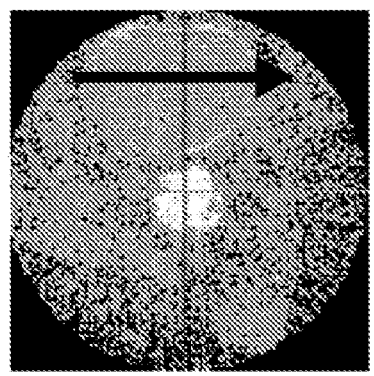
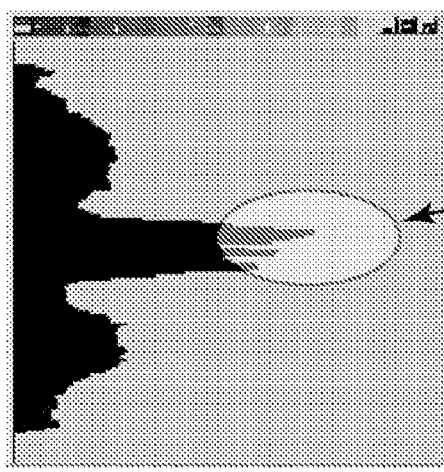
FIG. 8
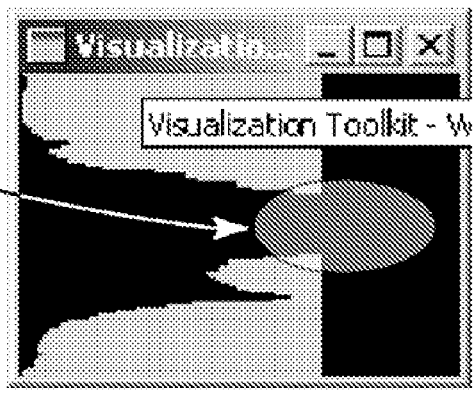
FIG. 9

METHOD FOR REGISTRATION AND NAVIGATION OF VOLUMETRIC SCANS USING ENERGY PROFILES

BACKGROUND OF THE INVENTION

1. Field of the Invention

The subject matter described herein relates generally to devices and methods for volumetric imaging and, more particularly, to devices and methods for processing volumetric images.

2. Related Art

Image registration involves the correlation of coordinate systems between multiple volumetric images of an object. For example, pre-operative imagery may be correlated to intra-operative, near real time, imagery in order to provide a complete global data set of an object for use by a surgeon operating with surgical equipment such as that sold under the mark "INNOVA" by the General Electric Company of Fairfield, Conn. The global data set that the pre-operative volumetric imaging provides, may be necessary as the intra-operative imagery images a much smaller region than the pre-operative imagery. For example, a pre-operative full abdomen scan may be registered with an intra-operative scan of an intervention site such as that of the liver or heart.

In one example of a current method of image registration, U.S. Patent Publication No. 2006/0002631 to Fu et al describes a method for image registration between a pre-operative three dimensional image and a two dimensional inter-operative image. This is accomplished by creating digital reconstructed radiographs from the three dimensional images and using a similarity measure (to compensate for local motion, position or deformation) to compare pixel intensities in the two dimensional image with that in the digital reconstructed radiographs. Image registration may be performed in a selected region of interest, which is based on defining an entropy measure H thereof and then selecting the region within the image in which the entropy measure is maximized.

However, disadvantages arise with use of such pixel intensity measuring and comparing methods in that the similarity metrics used depend on the overlapping region. They are not defined for images that do not overlap. Instead, each will either likely produce a poor result or will require several iterations to converge. For example, there might be several local minima where a purely intensity based registration might converge.

It will be noted that the publication entitled "Intelligent Data Splitting for Volume Data"; Shen and Bartsh, SPIE Medical imaging 2006 describes a method of volume splitting which includes creating a topogram and other forms of one-dimensional profiles. However, a disadvantage to this method is that it requires manual intervention when the pre-operative and intra-operative datasets have low overlap. In such a situation the user is required to manually provide point-pair correspondence, which it will be appreciated, can be fairly time-consuming and may even be unacceptable in a surgical environment. Other traditional atlases and roadmaps rely on detailed segmentation of structures that also can be time consuming and restricted to a local anatomy or dependent on data type or modality.

Accordingly, to date, no suitable device or method of identifying an ROI in a particular image scan, or providing registration between image scans within a reasonable short period of time, is available.

BRIEF DESCRIPTION OF THE INVENTION

In accordance with an embodiment of the present invention, a method is provided for identifying a location of a region of interest in a volumetric image scan that comprises a plurality of slices of an object and wherein each slice, in turn, comprises a plurality of pixels. The method comprises setting a predetermined pixel intensity threshold corresponding to a particular region of interest; identifying target pixels for each slice from the plurality of pixels that exceed the predetermined pixel intensity threshold; creating an energy profile from the target pixels for each slice; and comparing the energy profile to a predefined energy profile to determine the location of the region of interest.

In another aspect of the present invention, a method of image registration by matching a region of interest in a pair of volumetric image scans comprises setting a predetermined pixel intensity threshold corresponding to a particular region of interest; generating a first image scan comprising at least one first slice of an object, in turn, comprising a first plurality of pixels; identifying first target pixels from the first plurality of pixels that exceed the predetermined pixel intensity threshold; creating a first energy profile from the first target pixels; generating a second image scan comprising at least one second slice of the object, in turn, comprising a second plurality of pixels; identifying second target pixels from the second plurality of pixels that exceed the predetermined pixel intensity threshold; creating a second energy profile from the second target pixels; and comparing the first energy profile to the second energy profile to match the region of interest between the first volumetric image scan and the second volumetric image scan.

In still another aspect of the invention, a device is provided for identifying a location of a region of interest in a volumetric image scan that comprises a plurality of slices of an object and wherein each slice, in turn, comprises a plurality of pixels. The device comprises a processor that is configured to set a predetermined pixel intensity threshold corresponding to a particular region of interest; identify target pixels for each slice from the plurality of pixels that exceed the predetermined pixel intensity threshold; create an energy profile from the target pixels for each slice; and compare the energy profile to a predefined energy profile to determine the location of the region of interest.

In a further aspect of the invention, a system for performing image registration by matching a region of interest in a pair of volumetric image scans is provided. The system comprises a first imaging apparatus configured to generate a first image scan comprising at least one first slice of an object, each first slice, in turn, comprising a first plurality of pixels. A second imaging apparatus is configured to generate a second image scan comprising at least one second slice of the object, each second slice, in turn, comprises a second plurality of pixels. A processor is provided that is configured to set a predetermined pixel intensity threshold corresponding to a particular region of interest; identify first target pixels from the first plurality of pixels that exceed the predetermined pixel intensity threshold; create a first energy profile from the first target pixels; identify second target pixels from the second plurality of pixels that exceed the predetermined pixel intensity threshold; create a second energy profile from the second target pixels; and compare the first energy profile to the second energy profile to match the region of interest between the first volumetric image scan and the second volumetric image scan.

In still a further aspect of the invention, a device is provided for identifying a location of a region of interest in a volumetric image scan comprising a plurality of slices of an object and wherein each slice, in turn, comprises a plurality of pixels. The device may comprise means for setting a predetermined pixel intensity threshold corresponding to a particular region of interest; means for identifying target pixels for each slice from the plurality of pixels that exceed the predetermined pixel intensity threshold; means for creating an energy profile from the target pixels for each slice; and means for comparing the energy profile to a predefined energy profile to determine the location of the region of interest.

BRIEF DESCRIPTION OF THE DRAWINGS

The following detailed description is made with reference to the accompanying drawings, in which:

FIG. 2 is a block diagram of a system for registration of a plurality of scans;

FIGS. 3 through 5 are a series of images showing a volumetric scan, the scan after being subject to a threshold pixel intensity level and an energy profile of the scan after being subject to the threshold;

FIGS. 6 through 9 are a series of images showing a first volumetric slice, a second volumetric slice and corresponding energy profiles after being subject to a threshold pixel intensity level;

DETAILED DESCRIPTION OF THE PREFERRED EMBODIMENT

One embodiment of the present invention concerns a device and a method for identifying a region of interest (sometimes referred to herein as an "ROI") within a volumetric image scan. For example, anatomy based landmarks may be identified in volumetric image scans which can then be used in anatomy specific algorithms or to establish anatomical correspondence amongst scans from same/different modalities.

More specifically, and, e.g., during object or anatomical navigation, a data set of a first volumetric image may be loaded into an imaging device and, thereafter, rapid navigation to a region of interest may be carried out. This may be accomplished, in accordance with one particular embodiment of the present invention, by employing anatomical or pathological guides to speed up the anatomical navigation to a region of interest. Within the region of interest, pre-processing (window/level, threshold, noise suppression etc) may be performed followed by some type of segmentation (using manual, semi-automatic, or automatic techniques). Also, it can be seen that the use of such a pre-computed roadmap advantageously allows for the rapid redirection from one location to another across a volumetric image. Further, where it is desired to carry out the registration of plural images, it is highly advantageous to match corresponding anatomy at a rough level so that a better starting point may be leveraged for a faster and a better registration.

Figure 1:
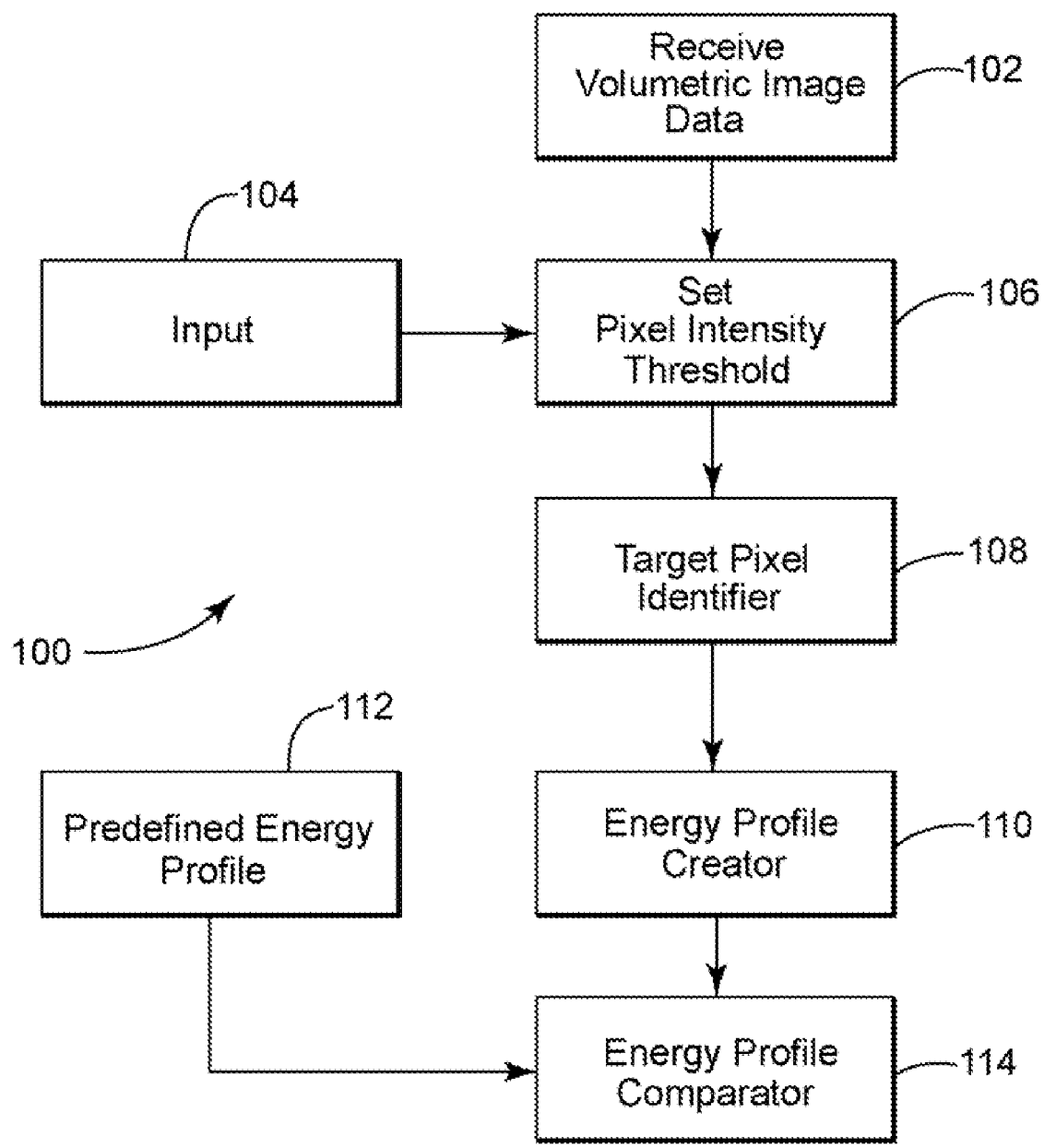
FIG. 1 is a block diagram of a system for navigation of volumetric scans using energy profiles.

Referring now to FIG. 1, a device for identifying a location of a region of interest in a volumetric image scan, in accordance with one embodiment of the present invention, is illustrated generally at 100. In this embodiment, the device 100 is configured to receive a volumetric image 102, accept input 104, set a pixel intensity threshold 106, provide a target pixel identification 108, create an energy profile 110, store a predefined energy profile 112 and to compare the energy profile 110 with the predefined energy profile at 114.

The device 100 may comprise a suitable processor for carrying out a series of instructions such as a known computer workstation and/or may comprise electrical components that are arranged in combination to perform one or more of the above described functions. It will be appreciated that the series of instructions may be embodied in the form of software and/or firmware. Also, it will be appreciated that the processor may be supported by other known hardware equipment such as a power supply and memory along with peripherals such as a monitor, a CD/DVD drive and a modem.

The device 100 may be separate from or interconnected with an imaging device such as a computed tomography scanner (not shown) that generates volumetric image data and that is illustrated as received at 102. The volumetric image data may comprise a generally global image of an object that includes a particular region of interest. The particular region of interest may be one at which, for example, a particular medical procedure is desired to be carried out or one at which it is advantageous to use for registration with another volumetric image.

The input 104 may comprise a keyboard, an input drive and/or a pointer such as a mouse. The input 104 may be employed, for example, to choose a slice direction such as along an axial, saggital or coronal plane, as described in more detail below, and/or to set or adjust a pixel intensity threshold 106.

The device 100 is further configured to provide target pixel identification 108 by employing the pixel intensity threshold 106 to determine which pixels have an intensity that is greater than the threshold. In one particular embodiment of the invention and as can be seen in the difference between the images in FIGS. 3 and 4, a threshold 106 may be set that strips out less intense pixel data, such as that corresponding to soft tissue as shown in FIG. 3, with the remainder being target pixels corresponding to a skeletal image as shown in FIG. 4.

Referring again to FIG. 1, the device 100 is further configured to create an energy profile 110 based on a slicing direction that may be input by an operator using input 104 described above. In one embodiment, the energy profile 110 comprises a measure of the total number of target pixels found per slice.

FIG. 5 illustrates one exemplary embodiment of an energy profile 510 created by the device 100 and that is based on an axial slicing direction. As shown in this example, the energy profile 510 is reflected by a number of pixels per slice, for example, a pelvic region is shown at 512, a shoulder region at 514 and a sinus region at 516. It has been found that each of the foregoing regions include configurations of the energy profile that are of course common to images of the same skeleton and that are generally common to differing skeletons.

It will be understood that in an optional embodiment the device 100 may be further configured to create an energy profile that is based on a modified Shannon entropy. Further details of one exemplary device for creating an energy profile based on a modified Shannon entropy is described in US Publication No. 2006/0002631, dated Jan. 5, 2006 which is incorporated herein by reference to the extent necessary to make and use such an embodiment.

The device 100 may be further configured to provide an energy profile comparison 114 to, e.g., a predefined energy profile 112 for navigational purposes. More specifically, when navigating the volumetric image data reflective of FIG.

3 for finding a location of, e.g., the pelvic region 512 or the shoulder region 514 within the volumetric image data, a predefined energy profile of the pelvic or the shoulder region may be compared with the energy profile created by the energy profile creator 110 to determine the location of the pelvic or shoulder region along the energy profile 510 and, in turn, within the volumetric image data.

In accordance with another embodiment of the present invention, a device for performing image registration by matching a region of interest in a pair of volumetric image scans is shown generally at 200. The device 200 may be similar and may comprise similar hardware to the device 100, described above and thus reference may be had above for those aspects. The device 200 is configured to receive first imaging data 202, accept input 204, set a first pixel intensity threshold 206, provide a first target pixel identification 208, create a first energy profile 210, receive second imaging data 222, accept input 225, set a second pixel intensity threshold 226, provide a second target pixel identification 228, create a second energy profile 230 and to compare the first energy profile with the second energy profile at 231.

It will be understood that the device 200 may be configured similar to that of the device 100 as described above and thus each of the details for configuring the device 200 to receive first imaging data 202, accept input 204, set a first pixel intensity threshold 206, provide a first target pixel identification 208, create a first energy profile 210, receive second imaging data 222, accept input 225, set a second pixel intensity threshold 226, provide a second target pixel identification 228 and create a second energy profile 230 will not be repeated except to say that in this embodiment both a first and a second energy profile is created. Also, while the inputs 204 and 205 are separate, it will be appreciated that a single input may be employed.

Figure 11:
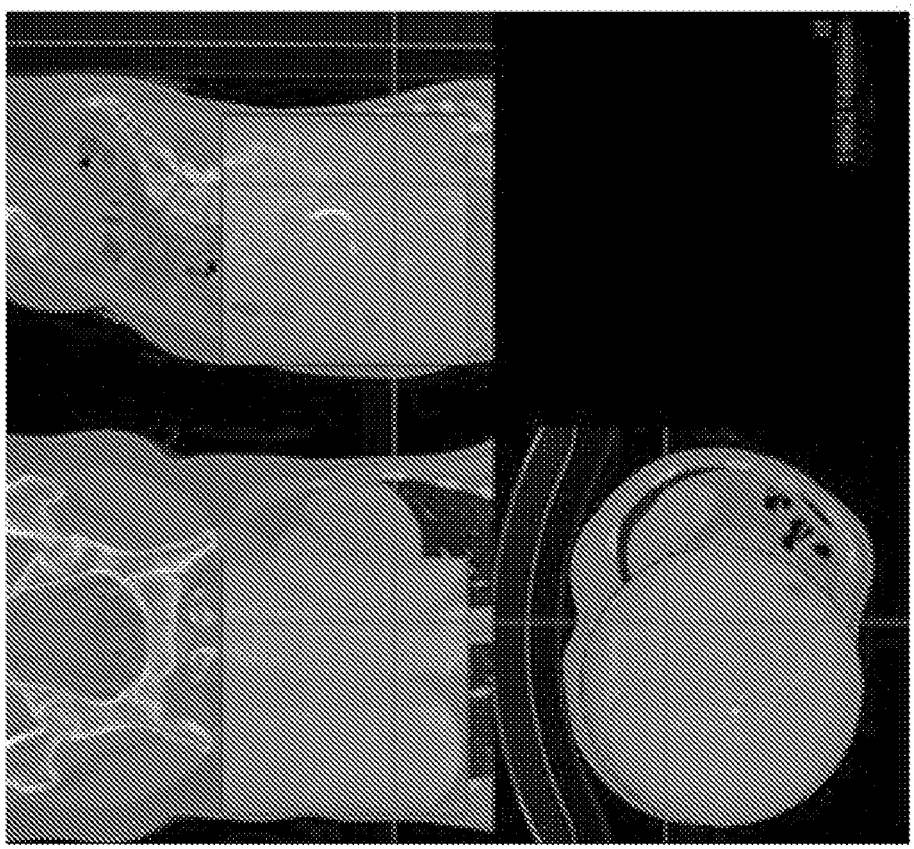
FIGS. 10 and 11 are a pair of images showing a before view of an energy based registration and an after view.
Figure 10:
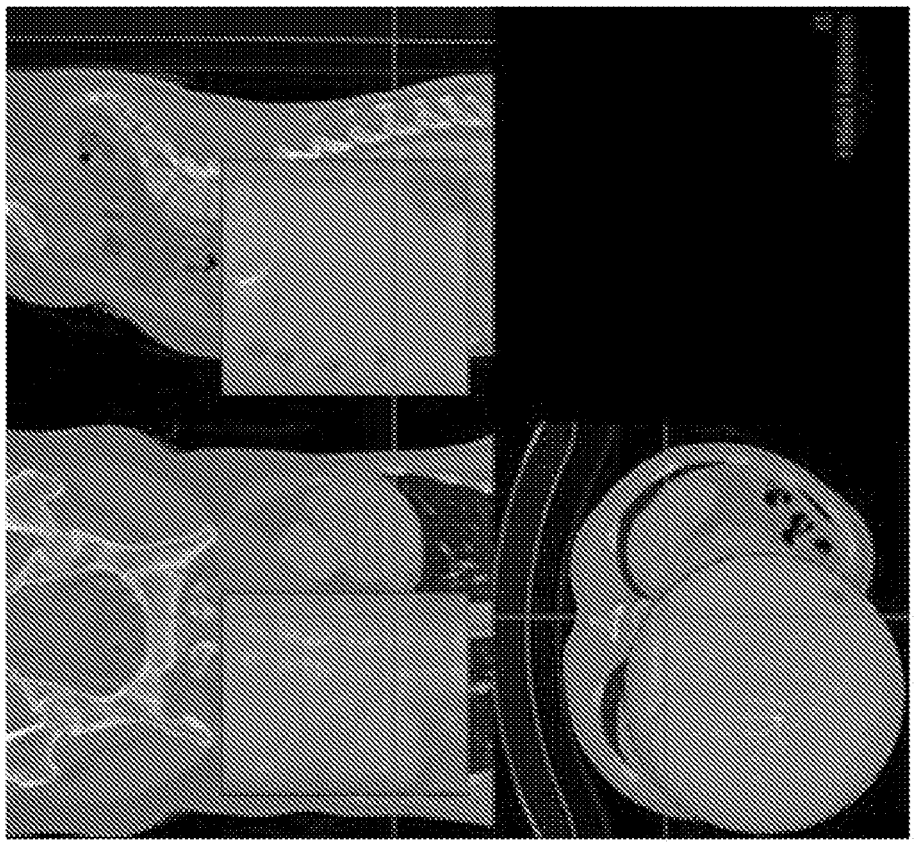

The device 200 is further configured to compare at 231 each of the first and second energy profiles in order to provide registration of a first set of image data with a second set of image data. One particular embodiment for registration of human body scans is illustrated in FIGS. 6 through 9, wherein, a comparison may be carried out by comparing each energy profile at the spine. FIGS. 6 and 7 each illustrate a respective portion of first and second volumetric image data showing a similar portion of a spine. FIGS. 8 and 9 each illustrate respective first and second energy profiles showing numbers of target pixels per slice that each correspond to the first and second volumetric image data. Accordingly, by matching up the first and second energy profiles, registration of each image data may be carried out. FIGS. 10 and 11 are images that reflect image data prior to registration and, more specifically, these images illustrate correspondences between the two volumetric datasets (CT (background) & 3D XR (overlay)) before and after registration respectively.

It will be appreciated that, as described above and in another optional embodiment of the present invention, an energy profile may be created that comprises a modified Shannon entropy. This advantageously achieves image registration for imaging modalities that are not absorptive in nature.

Figure 12:
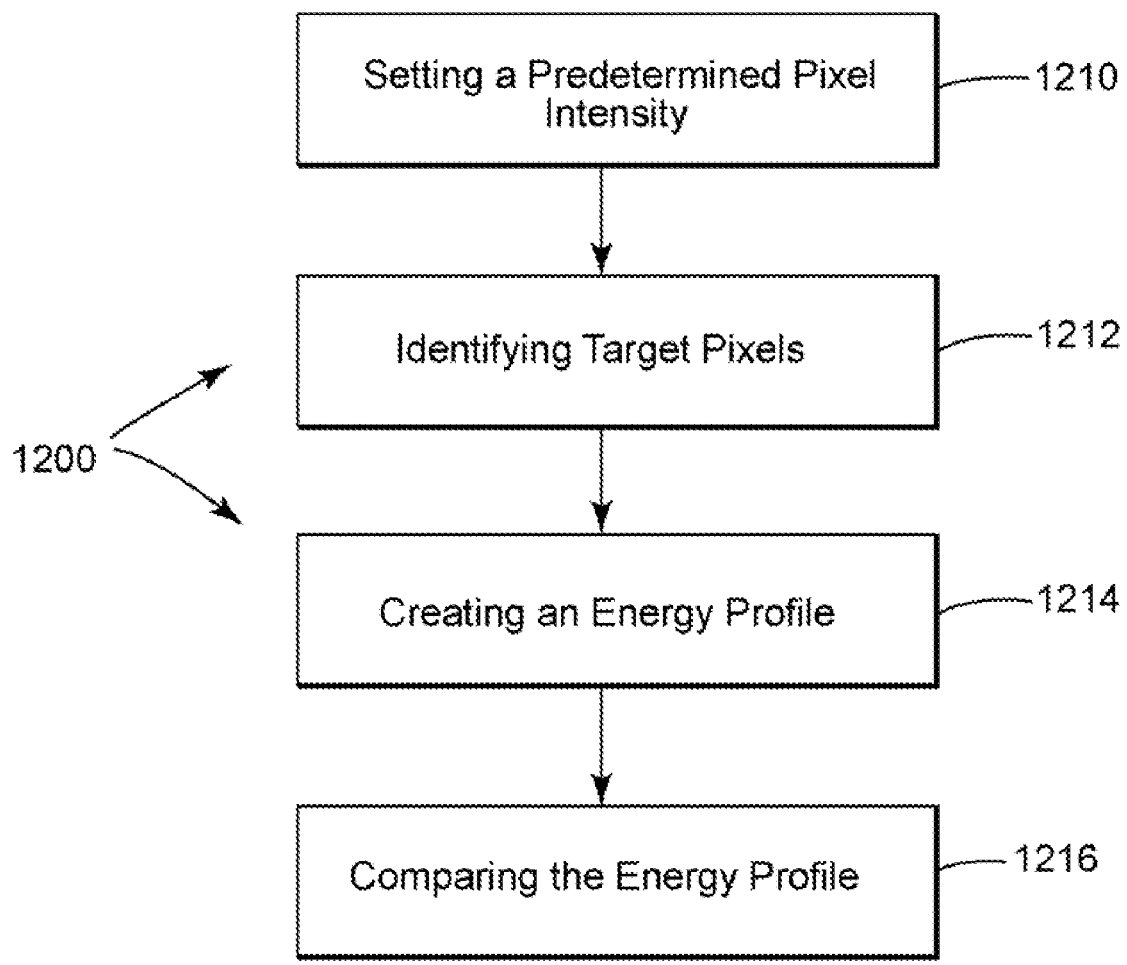
FIG. 12 is a flow diagram showing a method of identifying a location of a region of interest in a volumetric image scan in accordance with another embodiment of the present invention.

In accordance with another embodiment of the present invention and referring now to FIG. 12, a method of identifying a location of a region of interest in a volumetric image scan is shown generally at 1200. The volumetric image scan may comprise a plurality of slices of an object of which, each, in turn, comprises a plurality of pixels, the method comprises setting a predetermined pixel intensity threshold corresponding to a particular region of interest as shown at 1210. As shown at 1212, the method further comprises identifying target pixels for each slice from the plurality of pixels that exceed the predetermined pixel intensity threshold, as shown at 1214, creating an energy profile from the target pixels for each slice and, as shown at 1216, comparing the energy profile to a predefined energy profile to determine the location of the region of interest.

Figure 13:
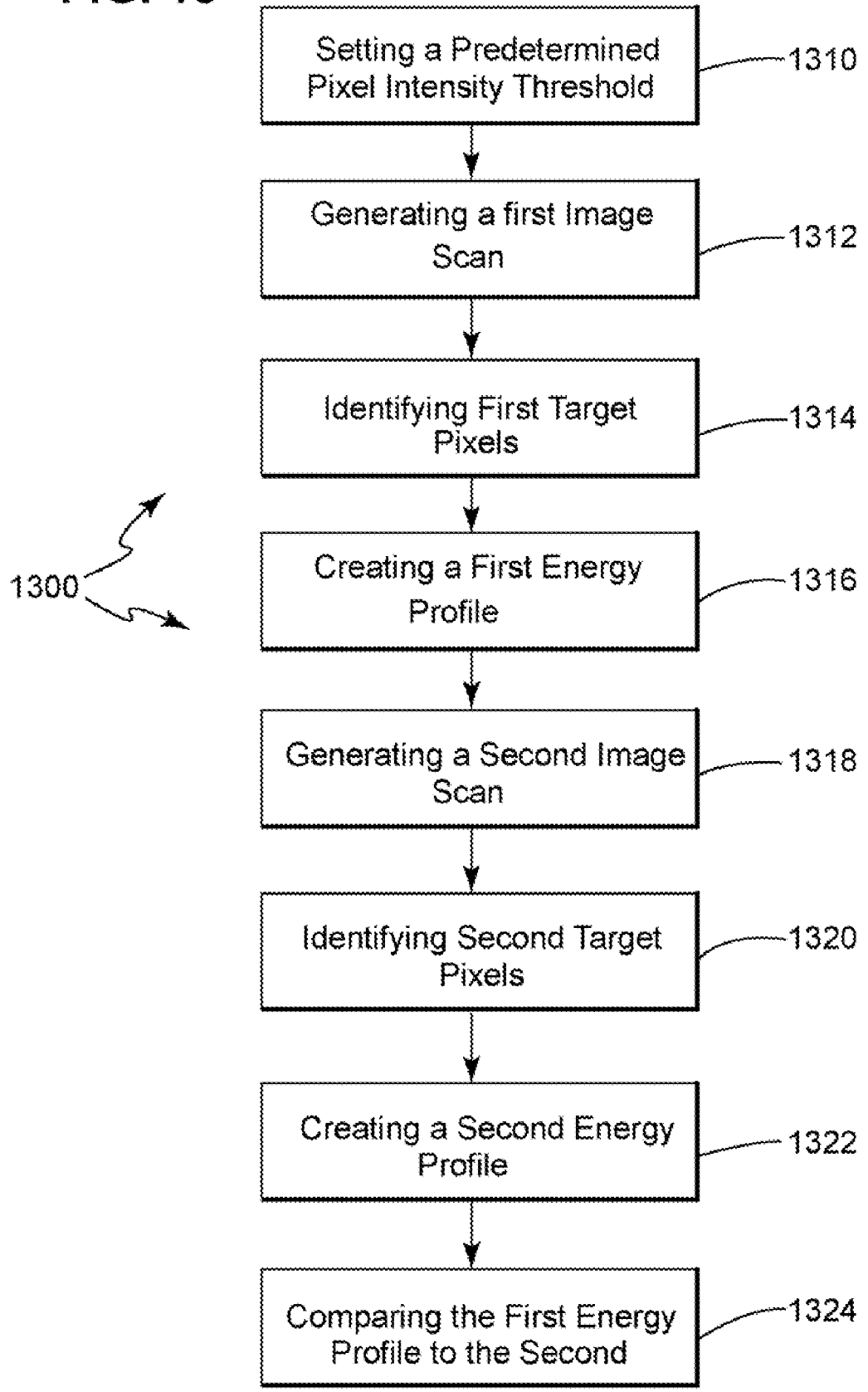
FIG. 13 is a flow diagram showing a method of image registration by matching a region of interest in a pair of volumetric image scans in accordance with a further embodiment of the present invention.

In accordance with a further embodiment of the present invention and referring now to FIG. 13, a method of image registration by matching a region of interest in a pair of volumetric image scans is shown generally at 1300. The method comprises setting a predetermined pixel intensity threshold corresponding to a particular region of interest as shown at 1310; generating a first volumetric image scan comprising at least one first slice of an object, in turn, comprising a first plurality of pixels as shown at 1312; identifying first target pixels from the first plurality of pixels that exceed the predetermined pixel intensity threshold as shown at 1314; creating a first energy profile from the first target pixels as shown at 1316; generating a second volumetric image scan comprising at least one second slice of the object, in turn, comprising a second plurality of pixels as shown at 1318; identifying second target pixels from the second plurality of pixels that exceed the predetermined pixel intensity threshold as shown at 1320; creating a second energy profile from the second target pixels as shown at 1322; and comparing the first energy profile to the second energy profile to match the region of interest between the first volumetric image scan and the second volumetric image scan as shown at 1324.

Technical effects of the herein described systems and methods include creating an energy profile to use in volumetric image navigation and image registration.

While the present invention has been described in connection with what are presently considered to be the most practical and preferred embodiments, it is to be understood that the present invention is not limited to these herein disclosed embodiments. Rather, the present invention is intended to cover all of the various modifications and equivalent arrangements included within the spirit and scope of the appended claims.

What is claimed is:
1. A method of image registration, comprising:
 setting a predetermined pixel intensity threshold;
 generating a first volumetric image scan from a first imaging modality, the first volumetric image scan comprising at least one first slice of an object, in turn, comprising a first plurality of pixels;
 identifying first target pixels from the first plurality of pixels, wherein the first target pixels exceed the predetermined pixel intensity threshold;
 creating a first energy profile from the first target pixels;
 generating a second image scan from a second imaging modality, the second image scan comprising at least one second slice of the object, in turn, comprising a second plurality of pixels;
 identifying second target pixels from the second plurality of pixels, wherein the second target pixels exceed the predetermined pixel intensity threshold;
 creating a second energy profile from the second target pixels;
 comparing the first energy profile to the second energy profile to match the region of interest in the first volumetric image scan and the second volumetric image scan,
 wherein the first imaging modality is different from the second imaging modality.

2. The method of claim 1, wherein the first imaging modality is employed pre-operatively, and wherein the second imaging modality is employed intra-operatively.

3. The method of claim 1, further comprising calculating a modified Shannon entropy to create each of the first energy profile and the second energy profile.

4. A system for performing image registration by matching a region of interest in a pair of volumetric image scans, the system comprising:
   a first imaging apparatus for a first imaging modality configured to generate a first image scan comprising at least one first slice of an object, each first slice, in turn, comprising a first plurality of pixels;
   a second imaging apparatus for a second imaging modality configured to generate a second image scan comprising at least one second slice of the object, each second slice, in turn, comprising a second plurality of pixels; and
   a processor, the processor being configured to:
      set a predetermined pixel intensity threshold;
      identify first target pixels from the first plurality of pixels, wherein the first target pixels exceed the predetermined pixel intensity threshold;
      create a first energy profile from the first target pixels;
      identify second target pixels from the second plurality of pixels, wherein the second target pixels exceed the predetermined pixel intensity threshold;
      create a second energy profile from the second target pixels; and
      compare the first energy profile to the second energy profile to match the region of interest in the first volumetric image scan and the second volumetric image scan,
   wherein the first imaging modality is different from the second imaging modality.

5. The system of claim 4, wherein the first imaging apparatus is employed pre-operatively and the second imaging apparatus is employed intra-operatively.

6. The system of claim 4, wherein the processor is further configured to calculate a modified Shannon entropy to create the first energy profile and the second energy profile.

* * * * *